United States Patent
Liu

(10) Patent No.: US 9,302,355 B2
(45) Date of Patent: Apr. 5, 2016

(54) METHOD OF PROCESSING GEAR REDUCTION BOX

(71) Applicant: CHANGCHUN RAILWAY VEHICLES CO., LTD., Changchun (CN)

(72) Inventor: Xiaofeng Liu, Changchun (CN)

(73) Assignee: CHANGCHUN RAILWAY VEHICLES CO., LTD., Changchun (CN)

(*) Notice: Subject to any disclaimer, the term of this patent is extended or adjusted under 35 U.S.C. 154(b) by 345 days.

(21) Appl. No.: 13/873,028

(22) Filed: Apr. 29, 2013

(65) Prior Publication Data

US 2013/0239389 A1 Sep. 19, 2013

Related U.S. Application Data

(63) Continuation of application No. PCT/CN2011/075238, filed on Jun. 3, 2011.

(30) Foreign Application Priority Data

Oct. 29, 2010 (CN) .......................... 2010 1 0527096

(51) Int. Cl.
*B23P 15/00* (2006.01)
*F16H 57/022* (2012.01)
*F16H 57/02* (2012.01)

(52) U.S. Cl.
CPC ................ *B23P 15/00* (2013.01); *F16H 57/02* (2013.01); *F16H 57/022* (2013.01); *Y10T 29/49826* (2015.01)

(58) Field of Classification Search
CPC ....... B23P 15/00; F16H 57/02; F16H 57/022; F16H 3/006; Y10T 74/19233; Y10T 74/19623; F02B 16/02
See application file for complete search history.

(56) References Cited

FOREIGN PATENT DOCUMENTS

| | | |
|---|---|---|
| CN | 1442334 A | 9/2003 |
| CN | 1224546 C | 10/2005 |
| CN | 1963262 A | 5/2007 |
| CN | 201073737 Y | 6/2008 |
| CN | 101722420 A | 6/2010 |
| CN | 101972920 A | 2/2011 |
| DE | 198 58 324 C1 | 3/2000 |
| JP | 2009-067243 A | 4/2009 |
| JP | 2010-132099 A | 6/2010 |

OTHER PUBLICATIONS

International Search Report of International Application No. PCT/CN2011/075238, dated Sep. 8, 2011.
Chinese First Examination Report of China Application No. 201010527096.9, dated Aug. 5, 2011.
Chinese Letter Patent Publication No. 101972920B, published on Jun. 27, 2012 of China Application No. 201010527096.9, filed on Oct. 29, 2010.

*Primary Examiner* — David Bryant
*Assistant Examiner* — Lee A Holly
(74) *Attorney, Agent, or Firm* — J.C. Patents

(57) ABSTRACT

A method of processing a gear reduction box is disclosed. Taking the outer wall of the driving gear hole on the gear reduction box as a reference, scribing the center $O_2$ of the driving gear hole, and scribing the center $O_1$ of the driven gear hole, then extending the connecting line $O_2O_1$ to two ends A and B of the gear reduction box body, and punching sample holes to facilitate alignment with a scribing needle. The gear reduction box is hanged on a processing jig, and the gear box is rotated as a whole by left-right movement of the left adjustable support assembly and up-down movement of the right adjustable support assembly, thereby the center $O_2$ of the driving gear hole and the center $O_1$ of the driven gear hole form a horizontal line. The connecting line $O_2O_1$ and a work table of the machine tool are horizontal.

4 Claims, 4 Drawing Sheets

METHOD OF PROCESSING GEAR REDUCTION BOX

CROSS-REFERENCE TO RELATED APPLICATIONS

This application is a continuation of International Application No. PCT/CN2011/075238, filed on Jun. 3, 2011, which claims the priority benefit of China Patent Application No. 201010527096.9, filed on Oct. 29, 2010. The contents of the above identified applications are incorporated herein by reference in their entireties.

FIELD OF THE TECHNOLOGY

The present invention relates to the mechanical components tooling technology field, and discloses a gear reduction box processing method.

BACKGROUND

During the production of Iran's 217 metros, gear reduction boxes are a large irregular thin-walled cast steel box, and during production, due to the influence of factors such as casting flaws of porosity and blowholes of the gearbox, easy deformation during processing, device status and staff status etc, the gearbox production efficiency and yield rate cannot meet the production requirements. Thus it is necessary to have a reasonable set of processing scheme to overcome various unfavorable factors in the production, and to improve the processing quality and efficiency of the gear reduction box.

SUMMARY

The technical problem to be solved by the present invention is to provide a gear reduction box processing method, utilizing the existing equipments to process a gear reduction box, so as to improve the processing efficiency of a gear reduction box and ensure a processing pass rate over 90% without increasing production cost.

In order to solve the above-mentioned technical problem, the present invention provides a method of processing gear reduction box, which comprises the following steps:

1) firstly, a central support disk and a scriber are used to scribe a center $O_2$ of a driving gear hole, and a scribing template and the central support disk are used to scribe a center $O_1$ of a driven gear hole, then the connecting line $O_2O_1$ of the centers of the driven gear hole and the driving gear hole is extended to the two end points A and B of the gear reduction box body, and sample holes are punched to facilitate alignment with a scribing needle;

2) the gear reduction box is hanged on a processing jig, and the gear box is rotated as a whole by left and right movement of a left adjustable support assembly and up and down movement of a right adjustable support assembly, thereby the center $O_2$ of the driving gear hole and the center $O_1$ of the driven gear hole form a horizontal line, and the connecting line AB of the centers of the driving gear hole and the driven gear hole is aligned by the scribing needle, such that the connecting line and a work table of a machine tool are horizontal, thereby the requirements for the processing precision of the center distance of a gear reduction box from the driving gear hole to the driven gear hole can be ensured;

3) firstly each section of the gear box is roughly processed, then surfaces and holes of a handle, a bottom plate and an oil needle seat are processed, and the driving gear hole and the driven gear hole are finely processed after welding.

The scribing template is to draw a vertical line $O_2D$ from the center $O_2$ of the driving gear hole to the flask joint $CO_1E$ of the gearbox, the angle $CO_1O_2$ equals to $a°+b°$, the overall rotation angle $b°$ of the gearbox is acquired by calculating a vertical distance H between the center of the driving driven gear hole and the center of the driven gear hole and the center distance $O_2O_1$, that is, $\sin b° = H/O_2O_1$.

The left adjustable support assembly comprises a locking plate, a supporting seat, a screw, a fixed seat, the screw is connected with the supporting seat through the fixed seat, both ends of the supporting seat are connected with the locking plate.

The right adjustable support assembly comprises a guide seat, an upper oblique wedge, a supporting seat, a lower oblique wedge, a screw, a fixed seat, the screw is connected with the lower oblique wedge, the upper oblique wedge is on the top of the lower oblique wedge and their oblique planes are opposite to each other, the supporting seat is disposed on the upper oblique wedge.

The present invention ensures the entire rotation of the gear reduction box by designing and manufacturing the processing jig, such that the centers of the driving gear hole and the driven gear hole could be processed in a horizontal line, thereby reduces accumulated system error of the machine tool, and makes it easy to compensate the processing precision for the center distance of the driving gear hole and the driven gear hole, such that the critical size of the center distance of the driving gear hole and the driven gear hole of the gear reduction box is easier to be ensured. And by designing and manufacturing the central support disk and the scribing template to determine the connecting line of centers of the driving gear hole and the driven gear hole of the gear reduction box, to facilitate alignment after the entire rotation of the gear reduction box and to avoid eccentric phenomenon of the processed driving gear hole and the driven gear hole, at the meantime by adopting the processing means of rough processing before fine processing to have the casting defects exposed and then welding, utilizing the existing equipments to process the gear reduction box, so as to improve the processing efficiency of the gear reduction box and ensure the processing pass rate over 90% without increasing production cost.

DETAILED DESCRIPTION OF THE EMBODIMENTS

Figure 1:
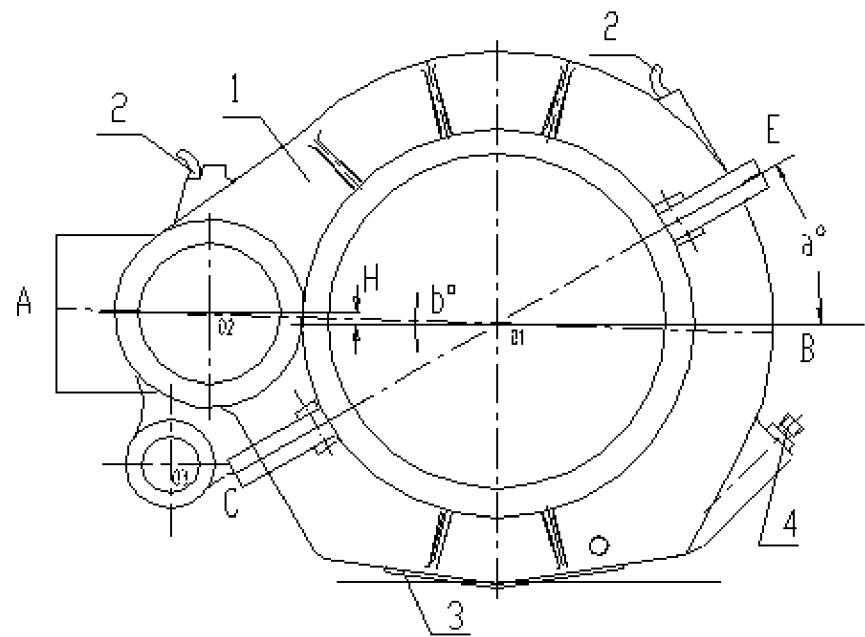
FIG. 1 is a schematic diagram of a gear reduction box of the present invention.
Figure 3:
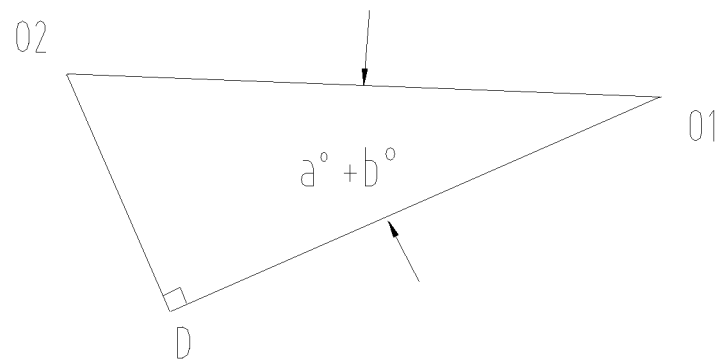
FIG. 3 is a schematic diagram of a scribing template of the present invention.
Figure 9:
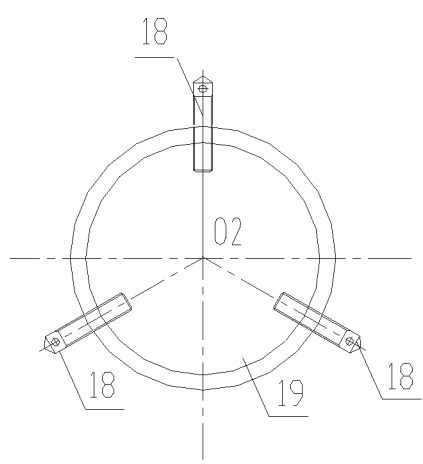
FIG. 9 is a schematic diagram of a central support disk assembly of the present invention.

1. Referring to FIG. 1, FIG. 3, FIG. 9, by using adjustable top 18 of the central support disk, central support disk 19 is fixed in a driving gear hole and a driven gear hole of the gear reduction box, and a scriber is used to scribe center $O_2$ of the driving gear hole, taking the outer wall of the driving gear hole on the gear reduction box as a reference. Then a scribing template $O_2O_1D$ is used to scribe center $O_1$ of the driven gear hole of the gear reduction box, $O_1D$ should be aligned with the flask joint $CO_1E$ of the gearbox. With the scribing template a vertical line $O_2D$ is drawn from the center $O_2$ of the driving gear hole to the flask joint $CO_1E$ of the gearbox, angle $CO_1O_2$ equals to $a°+b°$, the overall rotation angle $b°$ of the gearbox can be acquired by calculating the vertical distance H between the centers of the driving gear hole and the driven gear hole and the center distance $O_2O_1$, that is, $\sin b°=H/O_2O_1$. Then the connecting line $O_1O_2$ of the centers of the driven gear hole and the driving gear hole is extended to the two end points A and B of the gear reduction box body, and sample holes are punched to facilitate alignment with a scribing needle.

Figure 2:
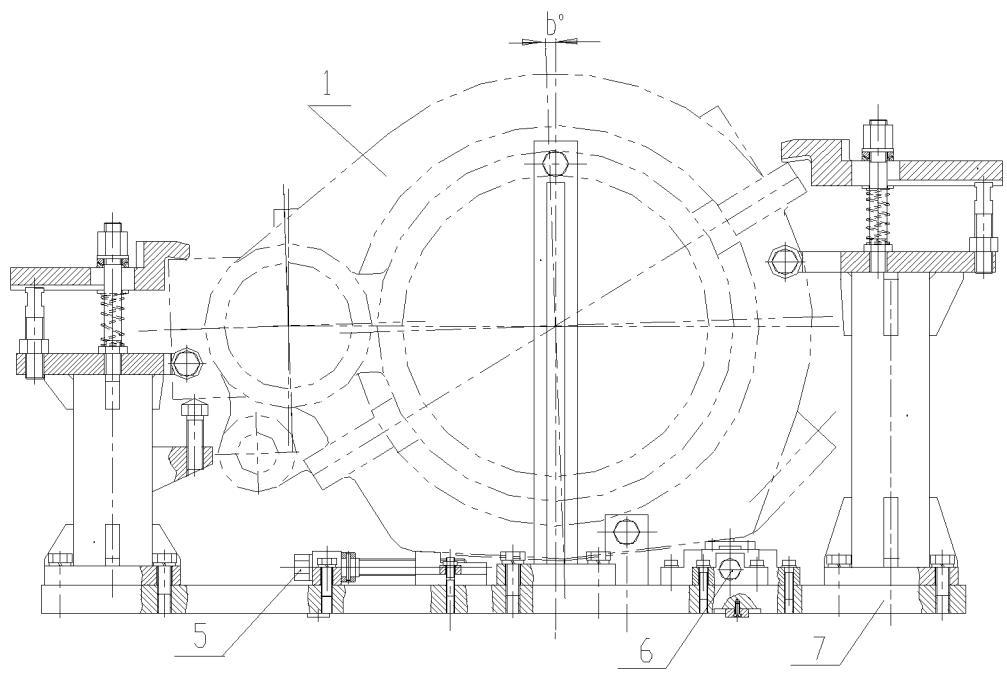
FIG. 2 is a schematic diagram of a processing jig of the gear reduction box of the present invention.

2. Referring to FIG. 2, FIG. 3, the gear reduction box is hanged on the processional processing jig, then using the scribing needle of the scribing disk to detect whether the two end points A and B of the gear reduction box are of equal height, if not, the gear box is rotated as a whole with $b°$ by adjusting the left adjustable support assembly 5 and the right adjustable support assembly 6 on the bottom plate 7 of the professional processing jig according to the height of the two end points, so as to ensure that point A and point B are of an equal height. After the gearbox is clamped as a whole, check the two end points A and B again to see whether the equal height is lost in the clamping process so as to avoid an error processing.

Figure 4:
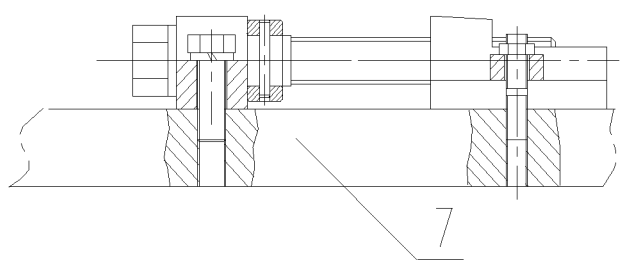
FIG. 4 is a schematic diagram of a left adjustable support assembly of the present invention.
Figure 5:
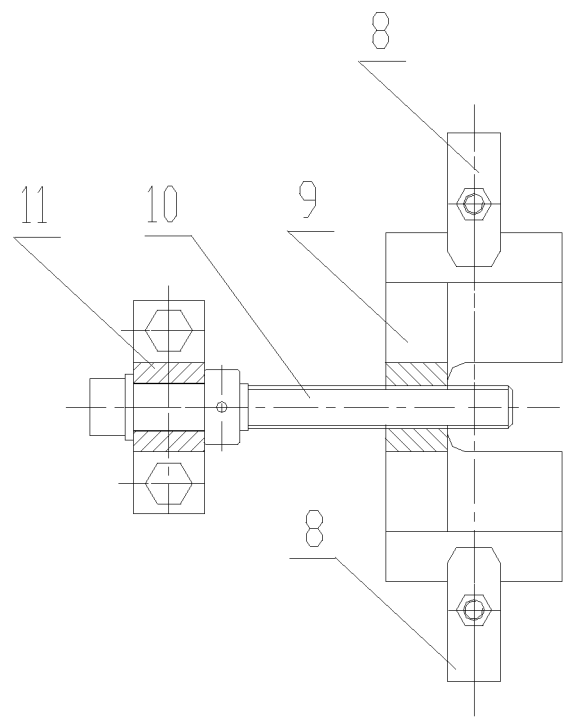
FIG. 5 is a top view of FIG. 4.

Referring to FIG. 4, FIG. 5, a fixed seat 11 formed by the left adjustable support assembly is fixed to the bottom plate 7 of the processing jig via screws, rotating screw 10 by a wrench to drive supporting seat 9 to realize left and right movement, such that the gear reduction box rotates to ensure that point A and point B have the equal height, locking plate 8 ensures the supporting seat does not move during the processing of the gear reduction box.

Figure 6:
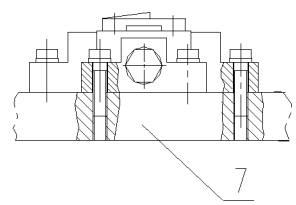
FIG. 6 is a schematic diagram of a right adjustable support assembly of the present invention.
Figure 7:
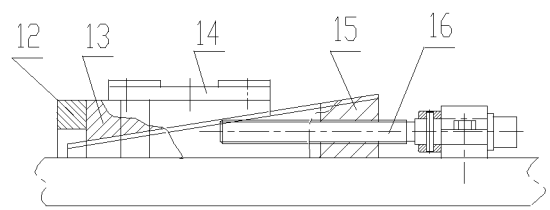
FIG. 7 is a side view of FIG. 6.
Figure 8:
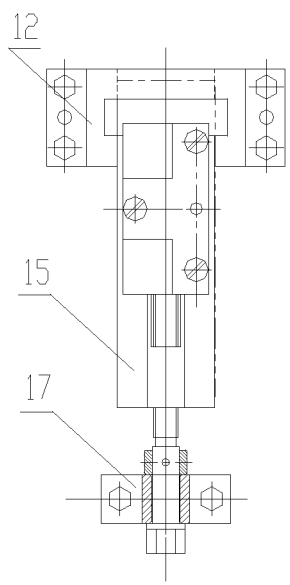
FIG. 8 is a top view of FIG. 6.

Refer to FIG. 6, FIG. 7, FIG. 8, a fixed seat 17 formed by the right adjusting support assembly and a guide seat 12 is fixed to the bottom plate 7 of the processing jig via screws, and rotating screw 16 by a wrench to drive the lower wedge 15 to realize forward and back movement, so as to realize up and down movement of upper wedge 13 and the fixed seat mounted thereof, such that the gear reduction box rotates to ensure point A and point B are at the equal height.

Referring to FIG. 1, before finely processing of the gear reduction box, rough processing is conducted, and a processing allowance of about 3 mm is reserved for the holes in the diameter direction, and repairing welding can be conducted to the exposed casting flaws, then the handle 2, the bottom plate 3 and the oil needle seat 4 of the gear reduction box are processed and welded, after all the procedures that could affect the final processing quality of the gear reduction box are completed without any problems, finally the gear reduction box are finely processed.

The invention claimed is:

1. A method of processing gear reduction box, comprising the following steps:
   1) firstly, scribing a center ($O_2$) of a driving gear hole using a central support disk (19) and a scriber, and scribing a center ($O_1$) of a driven gear hole using a scribing template and the central support disk, extending the connecting line ($O_1O_2$) of the centers of the driven gear hole and the driving gear hole to two end points (A) and (B) of a body of the gear reduction box, and punching sample holes (A) and (B) to facilitate alignment with a scribing needle;
   2) secondly, hanging the gear reduction box (1) on a processing jig, rotating the gear box as a whole by left and right movement of a left adjustable support assembly and up and down movement of a right adjustable support assembly, thereby the center ($O_2$) of the driving gear hole and the center ($O_1$) of the driven gear hole form a horizontal line, and aligning the connecting line (AB) of the centers of the driving gear hole and the driven gear hole by the scribing needle, such that the connecting line and a work table of a machine tool are horizontal, thereby the requirements for the processing precision of the center distance from the driving gear hole to the driven gear hole can be ensured;
   3) thirdly, conducting rough machining on each section of the gear box, processing surfaces and holes of a handle, a bottom plate and an oil needle seat, and conducting fine machining on the driving gear hole and the driven gear hole after welding.

2. The method of processing gear reduction box according to claim 1, characterized in that: a scribing template is formed by drawing a vertical line ($O_2D$) from the center ($O_2$) of the driving gear hole to the flask joint ($CO_1E$) of the gear box, wherein angle ($CO_1O_2$) equals to ($a°+b°$), the overall rotation angle ($b°$) of the gear box is acquired by calculating a vertical distance (H) between the center of the driving gear hole and the center of the driven gear hole and the center distance ($O_2O_1$), that is, $\sin b°=H/O_2O_1$.

3. The method of processing gear reduction box according to claim 1, characterized in that: the left adjustable support assembly comprises a locking plate, a supporting seat, a screw, a fixed seat, the screw is connected with the supporting seat through the fixed seat, both ends of the supporting seat are connected with the locking plate.

4. The method of processing gear reduction box according to claim 1, characterized in that: the right adjustable support assembly comprises a guide seat, an upper oblique wedge, a supporting seat, a lower oblique wedge, a screw, a fixed seat, the screw is connected with the lower oblique wedge, the upper wedge is on the top of the lower oblique wedge and their oblique planes are opposite to each other, the supporting seat is disposed on the upper oblique wedge.

* * * * *